United States Patent [19]

Dudgeon

[11] 4,308,118
[45] Dec. 29, 1981

[54] DEEP SECTION CURABLE EPOXY RESIN PUTTY

[75] Inventor: Charles D. Dudgeon, Clifton Park, N.Y.

[73] Assignee: General Electric Company, Schenectady, N.Y.

[21] Appl. No.: 53,259

[22] Filed: Jun. 29, 1979

[51] Int. Cl.³ .................................................. C08F 2/48
[52] U.S. Cl. ................................ 204/159.11; 156/272; 156/330; 204/159.14; 260/37 EP; 427/54.1; 427/44
[58] Field of Search ................. 427/54.1, 44; 156/272, 156/330; 260/37 EP; 204/159.11, 159.14

[56] References Cited

U.S. PATENT DOCUMENTS

| | | | |
|---|---|---|---|
| 3,412,046 | 11/1968 | Payne | 528/365 |
| 3,794,576 | 2/1974 | Watt | 204/159.11 |
| 3,842,023 | 10/1974 | Anagnostou et al. | 260/18 EP |
| 4,026,705 | 5/1977 | Crivello et al. | 96/27 R |
| 4,058,401 | 11/1977 | Crivello et al. | 96/115 R |
| 4,090,936 | 5/1978 | Barton | 204/159.18 |
| 4,173,551 | 11/1979 | Crivello | 260/18 EP |
| 4,175,973 | 11/1979 | Crivello | 260/37 EP |

OTHER PUBLICATIONS

Encyclopedia of Polymer Science, vol. 6, pp. 209 to 271, (1967), Interscience Publ., N.Y.

*Primary Examiner*—Melvyn I. Marquis
*Attorney, Agent, or Firm*—Morgan, Finnegan, Pine, Foley & Lee

[57] ABSTRACT

A composition uniquely adapted for use as a heat and ultraviolet light hardenable putty for filling metal surfaces comprises an epoxidic prepolymer, a catalyst precursor combination comprising an aromatic sulfonium salt of a complex halogenide and an aromatic iodonium salt of a complex halogenide, a copper salt catalyst activator, and a mineral filler in an amount sufficient to produce a paste-like consistency.

18 Claims, No Drawings

DEEP SECTION CURABLE EPOXY RESIN PUTTY

The present invention relates to mineral filled epoxy resin compositions curable on exposure to heat and ultraviolet radiation. More particularly it concerns putties comprising epoxidic prepolymers filled with mineral fillers and catalyzed with a combination of sulfonium and iodonium complex salts and co-catalyzed with copper.

BACKGROUND OF THE INVENTION

Epoxy resin compositions containing allylic bromide terminated polybutadienes, mixed with amine terminated polyamide curing agents just prior to application, have been disclosed as suitable replacements for molten metals such as automotive body solders in Anagnostou et al., U.S. Pat. No. 3,842,023. Payne, U.S. Pat. No. 3,412,046 discloses that arylsulfonium salts of simple anions may be employed as substitutes for tertiary amine catalysts in anhydride cured epoxy resin systems. Catalyzed epoxy resin compositions comprising epoxidic prepolymers and an aromatic diazonium salt of a complex halogenide are shown to be useful for coating and related applications at or near room temperature in Watt, U.S. Pat. No. 3,794,576. In this case, there is no need to mix immediately prior to use. Hardening is induced through heating or preferably through irradiation, as with ultraviolet (UV) light. Such epoxy resin materials are also hardenable by combination with radiation-sensitive aromatic sulfonium salts of complex halogenides, Crivello, U.S. Pat. No. 4,058,401, or with radiation-sensitive aromatic iodonium salts of complex halogenides, Crivello, U.S. Pat. No. 4,026,705. See also Barton, U.S. Pat. No. 4,090,936. Reducing agents, such as copper, tin, cobalt, and the like salts, and some acids have been reported to speed up the rate of cure of epoxy resin compositions in combination with aromatic onium salts. In addition, Crivello, U.S. Pat. No. 4,173,551 and copending Crivello application Ser. No. 940,564, filed Sept. 8, 1978, both of which are owned by the assignee of the present application. Such compositions can be flexibilized with polymers, such as polyether polyols or polyester polyols or with glycidyl ethers of alcohols, and filled with silica, talc, clay, glass fibers, hydrated alumina and the like, and applied to substrates, such as metal, rubber, and the like, for decorative, protective, insulating, sealing, and similar purposes. The foregoing patents and applications are incorporated herein by reference.

The UV-curable epoxy resin systems do, however, have a major disadvantage when heavily filled with mineral fillers, such as talc, and that is a lack of deep section cure. It is believed that this lack of cure is due to the inability of sufficient ultraviolet radiation to pass through the filler and give an adequate cure.

It has now been found that the problem of inadequate deep section cure can be overcome by the use of a catalyst combination which provides curing by both ultraviolet radiation and thermally. The thermal component of the catalyst precursor combination must be chosen carefully so that the UV catalyst does not interfere with the thermal catalyst and vice versa. Preferably, the cure speed of the thermal catalyst should be such that thermal cure is initiated by the heat given off by the same source (lamp) used to provide UV radiation, but this is not always essential. The major utility of the new discovery is in providing one-package putties to replace molten metal body solders in the manufacture of automobiles, and the like. The putty can be applied in the usual thicknesses to dents, dimples, gaps, etc; on the sheet metal, and then cured all of the way through by exposure to UV radiation and heat, in very short times, e.g., 1 to 15 minutes.

DESCRIPTION OF THE INVENTION

According to the present invention, there are provided polymerizable compositions comprising:
 (i) an epoxidic prepolymer;
 (ii) an effective amount of a catalyst precursor combination therefore comprising (a) from 10 to 90 parts by weight of an aromatic sulfonium salt of a complex halogenide and (b) from 90 to 10 parts by weight of an aromatic iodonium salt of a complex halogenide;
 (iii) a small but effective amount of a copper salt catalyst activator; and
 (iv) a mineral filler in an amount at least sufficient to produce a paste-like consistency in said composition.

The term "epoxidic prepolymer" when used herein and in the appended claims contemplates any of the conventional monomeric, dimeric, oligomeric or polymeric epoxy materials containing one or a plurality of epoxy functional groups. Preferably, they will be members of classes described chemically as (a) an epoxidic ester having two epoxycycloalkyl groups; (b) an epoxy resin prepolymer consisting predominately of the monomeric diglycidyl ether of bisphenol A; (c) a polyepoxidized phenol novolak or cresol novolak; (d) a polyglycidyl ether of a polyhydric alcohol; (e) a diepoxide of a cycloalkyl or alkylcycloalkyl hydrocarbon or ether; or (f) a mixture of any of the foregoing. To save unnecessarily detailed description, reference is made to the above-mentioned patents and the Encyclopedia of Polymer Science and Technology, Vol. 6, 1967, Interscience Publishers, New York, pages 209–271.

Suitable commercially available epoxidic esters are preferably, 3,4-epoxycyclohexylmethyl 3,4-epoxycyclohexanecarboxylate (Union Carbide ERL 4221, Ciba Geigy CY-179); as well as bis(3,4-epoxy-6-methylcyclohexylmethyl)adipate (Union Carbide ERL 4289); and bis(3,4-epoxycyclohexylmethyl)adipate (Union Carbide ERL 4299).

Suitable commercially available diglycidyl ethers of bisphenol-A are Ciba Geigy Araldite 6010, Dow Chemical DER 331, and Shell Chemical Epon 828.

A polyepoxidized phenol formaldehyde novolak prepolymer is available from Dow Chemical DEN 431 and 438, and a polyepoxidized cresol formaldehyde novolak prepolymer is available from Ciba-Geigy Araldite 538.

A polyglycidyl ether of a polyhydric alcohol is available from Ciba Geigy, based on butane-1,4-diol, Araldite RD-2; and from Shell Chemical Corp., based on glycerine, Epon 812.

A suitable diepoxide of an alkylcycloalkyl hydrocarbon is vinyl cyclohexene dioxide, Union Carbide ERL 4206; and a suitable diepoxide of a cycloalkyl ether is bis(2,3-epoxycyclopentyl)-ether, Union Carbide ERL 0400.

The catalyst precursor can be used in amounts of from 0.2 to 35, preferably from 0.5 to 15 parts by weight per 100 parts by weight of epoxidic prepolymer (i).

The aromatic sulfonium salts of complex halogenides used as component (ii)(a) are described in the above-mentioned U.S. Pat. No. 4,058,401. Typical such salts are triphenylsulfonium tetrafluoroborate, triphenylsulfonium hexafluoroantimonate, 5-phenyldibenzothiophenium fluoroborate, phenacyl tetramethylene sulfonium hexafluoroarsenate, triphenylsulfonium hexafluoroarsenate, and the like. Preferably, the aromatic sulfonium catalyst precursor component will comprise triphenylsulfonium hexafluoroantimonate.

The aromatic iodonium salts of complex halogenides used as component (ii)(b) are described in the above-mentioned U.S. Pat. No. 4,026,705. Typical such salts are 4,4'-dimethylphenyliodonium hexafluoroarsenate, 4,4'-di-t-butyl-diphenyliodonium hexafluoroarsenate, diphenyliodonium hexafluoroarsenate, diphenyliodonium hexafluorophosphate, diphenyliodonium hexafluoroantimonate, diphenyliodonium tetrafluoroborate, and the like. Preferably, the iodonium salt will comprise diphenyliodonium hexafluoroarsenate or diphenyliodonium hexafluorophosphate, and, especially preferably, the former.

An essential component in the compositions is a copper salt catalyst activator (iii). At least an effective amount will be used, which can be experimentally determined with ease by those of ordinary skill in this art. Preferably, it will comprise from about 0.05 to 20 parts, and especially preferably from about 0.1 to 10 parts, by weight per 100 parts by weight of said catalyst precursor combination (ii).

The copper salts will be any of those described in the above-mentioned applications Ser. No. 861,128, and 940,564 especially a copper halide, e.g., bromide, chloride, or copper stearate, copper gluconate, copper citrate, copper naphthenate, and the like. Especially preferably, copper naphthenate will be used.

The mineral filler component will be present in an amount at least sufficient to provide a paste- or putty-like consistency, again readily determinable by those skilled in this art. Preferably, an amount of from about 10 to about 500, but especially from about 50 to about 150, parts of filler per 100 parts by weight of epoxidic prepolymer componenont (i) will be used.

Any conventional mineral filler, such as those mentioned in the foregoing patents and applications can be employed. Typically the filler (iv) will comprise silica, talc, clay, glass fibers, hydrated alumina, asbestos, etc., and preferably it will be selected from barytes, silica, talc, mica dust or mixtures containing them. Special mention is made of talc as component (iv).

Optionally, as is suggested by the prior art listed above, the compositions of this invention can include an epoxy flexibilizer. This can comprise, for example a polyester-polyol, a polyether polyol a carbonyl-terminated rubbery copolymer of butadiene and acrylonitrile, a hydroxy-terminated copolymer of butadiene and acrylonitrile, a glycidylether of a monohydric alcohol or a mixture of any of the foregoing in an amount of up to one and one-half times the amount by weight of epoxidic ester (i) present in said composition. These coreact with the epoxides in known ways. See page 238 of the above-mentioned Vol. 6 of the Encyclopedia of Polymer Science and Technology. Typical among these are the hydroxylated polyesters known as Rucoflex, sold by Hooker Chemical, particularly Rucoflex 1028, which is a hydroxy terminated polyester based on phthalic anhydride and 1,6-hexanediol. A suitable polyether polyol is made by propoxylating bisphenol-A. The carbonyl-terminated rubbery copolymer of butadiene and acrylonitrite (CTBN) and the hydroxy-terminated rubbery copolymer of copolymer of butadiene and acrylonitrile (HTBN) are sold by B. F. Goodrich Chemical Co. They improve the moisture resistance of the cured compositions as well as enhancing flexibility. The amounts of component (v) used will generally be up to about 150 parts by weight per 100 parts by weight of epoxidic ester (i) present in the composition.

The curable compositions of the present invention can be made by blending the epoxidic prepolymer with the catalyst precursors, each preferably in a small amount of solvent such as triphenyl phosphate or methyl ethyl ketone, and the copper salt activator, also in a small amount of solvent. To the resulting composition is then added the mineral filler in portions until the desired amount is added and the desired consistency is reached.

The putty can be applied to a variety of substrates by conventional means and cured to a tack-free state within 0.5 to 20 minutes, and to a fully cured state in a slightly longer time. Preferably curing will be achieved by exposure to a strong source of UV energy which also emits a substantial thermal energy component. By way of illustration, three sun lamps (GE RS/HUV) in a cluster are especially suitable to produce a fully cured composition in about 5 minutes; but one minute will produce a cured surface, and then using an ordinary torch for 10–15 seconds will produce a deep cure. It has been found that a combination of two sun lamps and one infrared heat lamp can produce a fully cured composition in only 2 minutes.

EXAMPLE 1

A putty having the following formulation is prepared by thorough mixing:

| Composition | Parts by Weight |
| --- | --- |
| Bis(3,4-epoxycyclohexylmethyl)adipate[a] | 49.01 |
| Triphenylsulfonium hexafluoroantimonate (50% in triphenyl phosphate) | 0.98 |
| Diphenyliodonium hexafluoroarsenate (50% in methyl ethyl ketone) | 0.98 |
| Copper naphthenate | 0.02 |
| Talc filler | 49.01 |

[a] Union Carbide ERL 4299.

The putty is applied to a steel panel which has been dimpled with a Gardner Impact tester at 160"/lb. The putty is applied so that it fills the dimples and leaves approximately 1/16" of putty on the surface of the plate. The thickness to cure in the dimples is approximately 3/16".

The putty is then cured for five minutes under a cluster of three GE RS/HUV sun lamps. This results in a fully cured resin all the way to the bottom of each dimple.

Another panel is prepared, but cure is only for one minute under the lamps. This sets the surface only, with no cure occuring in the deep sections. The panel is then heated with a torch for approximately 10–15 seconds. This results in a fully cured resin all the way to the bottom of each dimple.

EXAMPLE 2

A putty having the following formulation is prepared by thorough mixing:

| Composition | Parts by Weight |
| --- | --- |
| Bis(3,4-epoxycyclohexylmethyl)adipate[a] | 29.6 |
| Polyester-polyol[b] | 7.4 |

| Composition | Parts by Weight |
|---|---|
| Triphenylsulfonium hexafluoroantimonate (50% in triphenyl phosphate) | 0.74 |
| Diphenyliodonoium hexafluoroarsenate (50% in methyl ethyl ketone) | 0.74 |
| Copper naphthenate | 0.007 |
| Talc | 60.0 |
| Fumed colloidal silica[c] | 1.5 |

[a]Union Carbide ERL 4299
[b]Hooker-Rucoflex 1028-210-hydroxy terminated polyester of phthalic anhydride and 1,6-hexanediol.
[c]Cab-o-Sil M-5 Thixotropic agent When applied to steel panels and cured for five minutes under a sun lamp, this formulation is fully cured and firmly adherent.

EXAMPLE 3

A putty having the following formulation is prepared by first mixing the first four ingredients on a Cowles mixer and then adding to the last four in a vacuum mixer:

| Composition | Parts by Weight |
|---|---|
| Bis(3,4-epoxycyclohexylmethyl)adipate[a] | 22.35 |
| Polyester-polyol[b] | 14.90 |
| Fumed collidal silica[c] | 2.23 |
| Surfactant long chain hydroxy terminated polyether[d] | 0.45 |
| Triphenylsulfonium hexafluoroantimonate (50% in triphenyl phosphate) | 0.84 |
| Diphenyliodonium hexafluoroarsenate (50% in methyl ethyl ketone) | 1.68 |
| Copper naphthenate | 0.034 |
| Talc | 55.88 |

[a]Union Carbide ERL 4299
[b]Rucoflex 1028
[c]Cab-o-Sil M5
[d]Atlas surfactant G-2240, ICI America This gives full depth cure in five minutes under a sun lamp.

EXAMPLE 4

A putty from a different epoxy prepolymer and having the following formulation is prepared by thoroughly mixing:

| Composition | Parts by Weight |
|---|---|
| 3,4-epoxycyclohexylmethyl 3,4-epoxycyclohexane carboxylate[a] | 22.35 |
| Polyester-polyol[b] | 14.90 |
| Fumed colloidal silica[c] | 2.23 |
| Surfactant[d] | 0.45 |
| Triphenylsulfonium hexafluoroantimonate (50% in triphenyl phosphate) | 0.84 |
| Diphenyliodonium hexafluoroarsenate (50% in methyl ethyl ketone) | 1.68 |
| Copper naphthenate | 0.034 |
| Talc | 55.88 |

[a]Union Carbide ERL 4221
[b]Rucoflex 1028
[c]Cab-o-Sil M-5
[d]See footnote Example 3

This cures hard in 5 minutes under a sun lamp.

EXAMPLE 5-6

Two putties having different catalyst combinations are prepared by thoroughly mixing:

| Composition (parts by weight) | Example 5 | Example 6 |
|---|---|---|
| Bis(3,4-epoxycyclohexylmethyl)adipate[a] | 29.6 | 29.6 |
| Polyester-polyol[b] | 8.0 | 8.0 |
| Fumed colloidal silica[c] | 2.0 | 2.0 |
| Surfactant[d] | 0.4 | 0.4 |
| Triphenylsulfonium hexafluoroantimonate (50% in propylene carbonate) | 0.9 | 0.9 |
| Diphenyliodonium hexafluoroarsenate (50% in methyl ethyl ketone) | 1.8 | — |
| Diphenyliodonium hexafluorophosphate (50% in methyl ethyl ketone) | — | 1.8 |
| Copper naphthenate | 0.036 | 0.036 |
| Talc | 60.0 | 60.0 |

[a]Union Carbide ERL 4299
[b]Rucoflex 1028
[c]Cab-o-Sil M-5
[d]Atlas G-2240

Example 5 cures to full depth under 3 sun lamps in 5.0 minutes. Example 6 cures to full depth under the same 3 sun lamps in 11.0 minutes.

EXAMPLES 7-10

Four putties having different fillers are prepared by thoroughly mixing:

| Example | 7 | 8 | 9 | 10 |
|---|---|---|---|---|
| Bis(3,4-epoxycyclohexylmethyl) adipate | 16 | 16 | 16 | 16 |
| Polyester-polyol (Rucoflex 1028) | 24 | 24 | 24 | 24 |
| Triphenylsulfonium hexafluoro antimonate(50% in propylene carbonate) | 0.9 | 0.9 | 0.9 | 0.9 |
| Diphenylidonium hexafluoroarsenate (50% in methyl ethyl ketone) | 1.8 | 1.8 | 1.8 | 1.8 |
| Copper naphthenate | 0.036 | 0.036 | 0.036 | 0.036 |
| Barytes filler | 143 | — | — | — |
| Silica filler | — | 120 | — | — |
| Talc Filler | — | — | 120 | — |
| Mica dust filler | — | — | — | 35 |

Discs of 4"×½" are made from each sample and hardened under a cluster of 3 sun lamps for 5 minutes. Then after cooling to the touch (about ½ hour) the Shore D hardness is measured with the following result: Example 7, D=7.0; Example 8, D=8.0; Example 9, D=9.0; Example 10, D=4.0.

EXAMPLE 11

A putty is prepared by first mixing the first four ingredients in a Cowles mixer and then mixing this with the last four in a vacuum mixer;

| Composition | Parts by Weight |
|---|---|
| 3,4-epoxycyclohexyl 3,4-epoxy-cyclohexane carboxylate[a] | 368 |
| Polyester-polyol[b] | 368 |
| Fumed colloidal silica[c] | 66 |
| Surfactant[d] | 12.8 |
| Diphenyliodonium hexafluoroarsenate (50% in methyl ethyl ketone) | 34 |
| Triphenylsulfonium hexafluoroantimonate (50% in propylene carbonate) | 17 |
| Copper naphthenate | 0.34 |
| Talc | 1136 |

[a]Union Carbide ERL 4221
[b]Hooker Rucoflex 1028
[c]Cab-O-Sil M5
[d]Atlas G-2240

Dimples in sheet steel are filled with the composition and exposed to radiant energy emitted by two infrared lamps and two UV lamps. Full depth cures are achieved in 2.15 and 2.11 minutes, respectively.

EXAMPLES 12–13

Two putties are prepared substituting butadieneacrylonitrile derivatives for the polyester polyol. The formulations employed are as follows.

| Composition (parts by weight) | Example 12 | Example 13 |
|---|---|---|
| 3,4-Epoxycyclohexyl 3,4-epoxy-cyclohexane carboxylate[a] | 606 | 606 |
| Carbonyl-terminated rubbery copolymers of butadiene and acrylonitrile[b] | 152 | — |
| Hydroxy-terminated rubbery copolymer of butadiene and acrylonitrile[c] | — | 152 |
| Fumed colloidal silica[d] | 45.5 | 45.5 |
| Surfactant[e] | 9.9 | 9.9 |
| Triphenylsulfonium hexafluoroantimonate (50% in propylene carbonate) | 12.1 | 13.6 |
| Diphenyliodonium hexafluoroarsenate (50% in methyl ethyl ketone) | 24 | 27 |
| Copper naphthenate | 0.24 | 0.27 |
| Talc | 1136 | 1136 |

[a, d,] and [e] - See footnotes in Example 11.
[b] Goodrich CTBN
[c] Goodrich HTBN Example 12 cures with a cluster of two infrared lamps and two ultraviolet lamps in 3.0 minutes, and Example 13 cures in 2.35 minutes. Shore D hardness on Example 13 is 60.

EXAMPLE 14

A putty is prepared from another epoxyprepolymer by mixing:

| Composition | Parts by Weight |
|---|---|
| Bisglicydyl ether of bisphenol-A[a] | 400 |
| Glycidyl ether of octyl and decyl alcohols[b] | 100 |
| Triphenylsulfonium hexafluoroantimonate (50% in propylene carbonate) | 10 |
| Diphenyliodonium hexafluoroarsenate (50% in methyl ethyl ketone) | 20 |
| Copper naphthenate | 0.2 |
| Talc | 500 |

[a] Shell Chemical, Epon 828
[b] Heloxy WC 7 Wilmington Chemical Co.

The mixture is degassed in a vacuum oven, applied to a dimpled steel panel and fully cures under a bank of 2 UV and 1 infrared lamp in 2 minutes.

EXAMPLE 15

A putty is prepared from a mixture of epoxy prepolymers by mixing:

| Composition | Parts by Weight |
|---|---|
| 3,4-Epoxycyclohexyl 3,4-epoxy-cyclohexane carboxylate[a] | 256 |
| Epoxylated novolac resin[b] | 170 |
| Polyester-polyol[c] | 183 |
| Glycidyl ether of polyol[d] | 153 |
| Fumed colloidal silica[e] | 45.6 |
| Surfactant[f] | 8.9 |
| Triphenylsulfonium hexafluoroantimonate (50% in propylene carbonate) | 12.75 |
| Diphenyliodonium hexafluoroarsenate (50% in methyl ethyl ketone) | 25.5 |
| Copper naphthenate | 0.25 |
| Talc | 1136.0 |

[a] Union Carbide ERL 4221
[b] Dow Chemical DEN 431
[c] Rucoflex 1028
[d] Celanese Polymer Specialties Co. EPI-Rez 507
[e] Cab-O-Sil, M-5
[f] Atlas G 2240

Under a cluster of two infrared lamps and two ultraviolet lamps, the cure time is 2.25 minutes. The Shore D hardness is 65.

It is obvious that many variations will suggest themselves in light of the above-detailed description. For example, instead of a steel substrate, the putty can be applied to reinforced resin, ceramic, glass, aluminum, copper, and the like. In addition to its filling and bridging function, the putty can also act as an adhesive bonding agent between adjacent surfaces of the same or dissimilar substrate materials. All such obvious variations are within the full intended scope of the appended claims.

I claim:
1. A polymerizable composition comprising
   (i) an epoxidic prepolymer;
   (ii) an effective amount of a catalyst precursor combination therefore comprising (a) from 10 to 90 parts by weight of an aromatic sulfonium salt of a complex halogenide and (b) from 90 to 10 parts by weight of an aromatic iodonium salt of a complex halogenide;
   (iii) a small but effective amount of a copper salt catalyst activator; and
   (iv) a mineral filler in an amount at least sufficient to produce a paste-like consistency in said composition.
2. A composition as defined in claim 1 wherein said epoxidic prepolymer is selected from
   (a) an epoxidic ester having two epoxycycloalkyl groups;
   (b) an epoxy resin prepolymer consisting predominently of the monomeric diglycidyl ether of bisphenol-A;
   (c) a polyepoxidized phenol novolak or cresol novolak;
   (d) a polyglycidyl ether of a polyhydric alcohol;
   (e) a diepoxide of a cycloalkyl or alkylcycloalkyl hydrocarbon or ether; or
   (f) a mixture of any of the foregoing.
3. A polymerizable composition as defined in claim 1 which further comprises (v) a polyesterpolyol or polyether polyol, a carbonyl-terminated rubbery copolymer of butadiene and acrylonitrile, a hydroxy-terminated copolymer of butadiene and acrylonitrile, a glycidyl ether of a monohydric alcohol, or a mixture of any of the foregoing in an amount of up to one and one-half times the amount by weight of epoxidic prepolymer (i) present in said composition.
4. A composition as defined in claim 2 wherein said epoxidic ester (i)(a) is selected from 3,4-epoxycyclohexylmethyl 3,4-epoxycyclohexanecarboxylate, bis(3,4-epoxy-6-methylcyclohexylmethyl)adipate, bis(3,4-epoxycyclohexylmethyl)adipate or a mixture of any of the foregoing.

5. A composition as defined in claim 4 wherein said epoxidic ester (i)(a) is 3,4-epoxycyclohexylmethyl 3,4-epoxycyclohexane carboxylate.

6. A composition as defined in claim 1 wherein said catalyst precursor combination (ii) comprises from about 0.5 to about 15 parts by weight per 100 parts by weight of epoxidic prepolymer (i).

7. A composition as defined in claim 1 wherein said catalyst precursor component (ii)(a) comprises triphenylsulfonium hexaflurorantimonate.

8. A composition as defined in claim 1 wherein said catalyst precursor component (ii)(b) comprises diphenyliodonium hexafluoroarsenate, diphenyliodonium hexafluorophosphate or a mixture of the foregoing.

9. A composition as defined in claim 8 wherein said catalyst precursor component (ii)(b) comprises diphenyliodonium hexafluoroarsenate.

10. A composition as defined in claim 1 wherein said copper salt catalyst activator (iii) comprises from 0.1 to 10 parts by weight per 100 parts by weight of said catalyst precursor combination (ii).

11. A composition as defined in claim 1 wherein said copper salt catalyst activator (iii) comprises a copper halide, copper benzoate, copper stearate, copper gluconate, copper citrate, copper naphthenate or a mixture of any of the foregoing.

12. A composition as defined in claim 11 wherein said copper salt catalyst activator comprises copper naphthenate.

13. A composition as defined in claim 1 wherein said mineral filler (iv) comprises from about 10 to about 500 parts by weight per 100 parts by weight of epoxidic prepolymer component (i).

14. A composition as defined in claim 1 wherein said filler component (iv) is selected from barytes, silica, talc, mica dust, or a mixture of any of the foregoing.

15. A composition as defined in claim 14 wherein said filler component (iv) comprises talc.

16. A composition as defined in claim 3 wherein component (v) comprises a polyester polyol.

17. A method for filling depressions, for bridging protrusions or for joining adjacent surfaces in a substrate which comprises applying a filling, bridging or bonding amount of a composition as defined in claim 1 to said substrate and exposing said composition to radiant energy until the composition polymerizes and filling, bridging or bonding is substantially complete.

18. An article of manufacture which comprises a substrate at least a part of which has been filled, bridged or bonded by applying a composition as defined in claim 1 and exposing said composition to radiant energy until the composition has substantially completely polymerized.

* * * * *